US010550712B2

(12) United States Patent
Durand et al.

(10) Patent No.: US 10,550,712 B2
(45) Date of Patent: Feb. 4, 2020

(54) ROTOR VANE WITH ACTIVE CLEARANCE CONTROL, ROTARY ASSEMBLY AND OPERATING METHOD THEREOF

(71) Applicant: Safran Aircraft Engines, Paris (FR)

(72) Inventors: Didier Noël Durand, Moissy-Cramayel (FR); Olivier Jean Daniel Baumas, Moissy-Cramayel (FR); Nicolas Daniel Delaporte, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 152 days.

(21) Appl. No.: 15/522,103

(22) PCT Filed: Oct. 22, 2015

(86) PCT No.: PCT/FR2015/052844
§ 371 (c)(1),
(2) Date: Apr. 26, 2017

(87) PCT Pub. No.: WO2016/066932
PCT Pub. Date: May 6, 2016

(65) Prior Publication Data
US 2017/0335709 A1 Nov. 23, 2017

(30) Foreign Application Priority Data
Oct. 28, 2014 (FR) .................................... 14 60356

(51) Int. Cl.
*F01D 11/16* (2006.01)
*F01D 11/12* (2006.01)
*F01D 25/24* (2006.01)

(52) U.S. Cl.
CPC ............ *F01D 11/16* (2013.01); *F01D 11/122* (2013.01); *F01D 25/24* (2013.01); *F05D 2220/32* (2013.01)

(58) Field of Classification Search
CPC . F01D 5/20; F01D 5/224; F01D 11/16; F01D 11/122; F01D 25/24
See application file for complete search history.

(56) References Cited

U.S. PATENT DOCUMENTS

| 6,161,836 | A | * | 12/2000 | Zhou | .................... F16J 15/3288 |
| | | | | | 277/355 |
| 6,926,495 | B2 | * | 8/2005 | Diakunchak | ............ F01D 5/225 |
| | | | | | 415/12 |
| 9,771,870 | B2 | * | 9/2017 | Dierksmeier | ........... F01D 5/085 |
| 2005/0058539 | A1 | | 3/2005 | Diakunchak | |

(Continued)

FOREIGN PATENT DOCUMENTS

DE 10 2004 050 739 A1 4/2006
EP 2 182 174 A2 5/2010

OTHER PUBLICATIONS

Wikipedia, Ball Joint, 2013, retrieved from https://web.archive.org/web/20130628183437/https://en.wikipedia.org/wiki/Ball_joint.*

*Primary Examiner* — Woody A Lee, Jr.
(74) *Attorney, Agent, or Firm* — Blank Rome LLP

(57) ABSTRACT

The invention relates to a motor vane for a turbine engine, comprising a body (170) locally defining a blade provided at the radially outer end with a root (33), characterised in that it also comprises at least one sealing element (39) extending beyond the radially outer end of the root and connected to an area of the root by means of a movable mechanical link (37).

12 Claims, 4 Drawing Sheets

(56) References Cited

U.S. PATENT DOCUMENTS

2005/0175447 A1* 8/2005 Garner ..................... F01D 5/20
  415/173.3
2009/0252602 A1 10/2009 Diakunchak
2009/0269189 A1* 10/2009 Bottome ................. F01D 11/12
  415/173.3

* cited by examiner

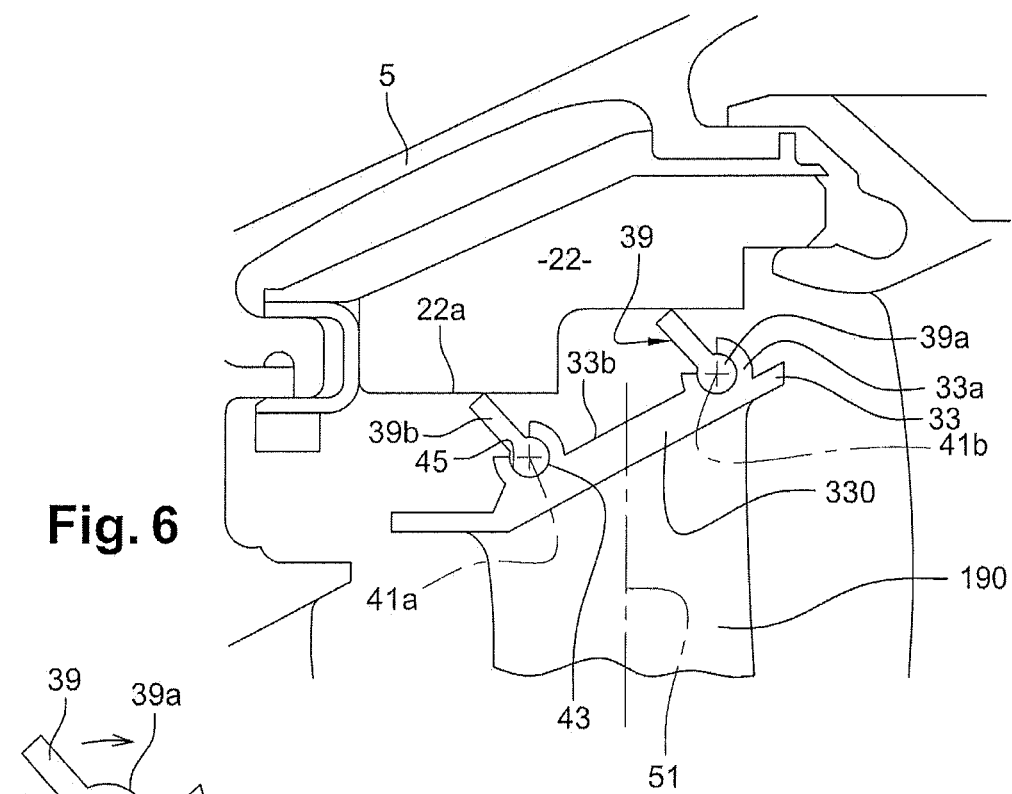
Fig. 6
Fig. 8
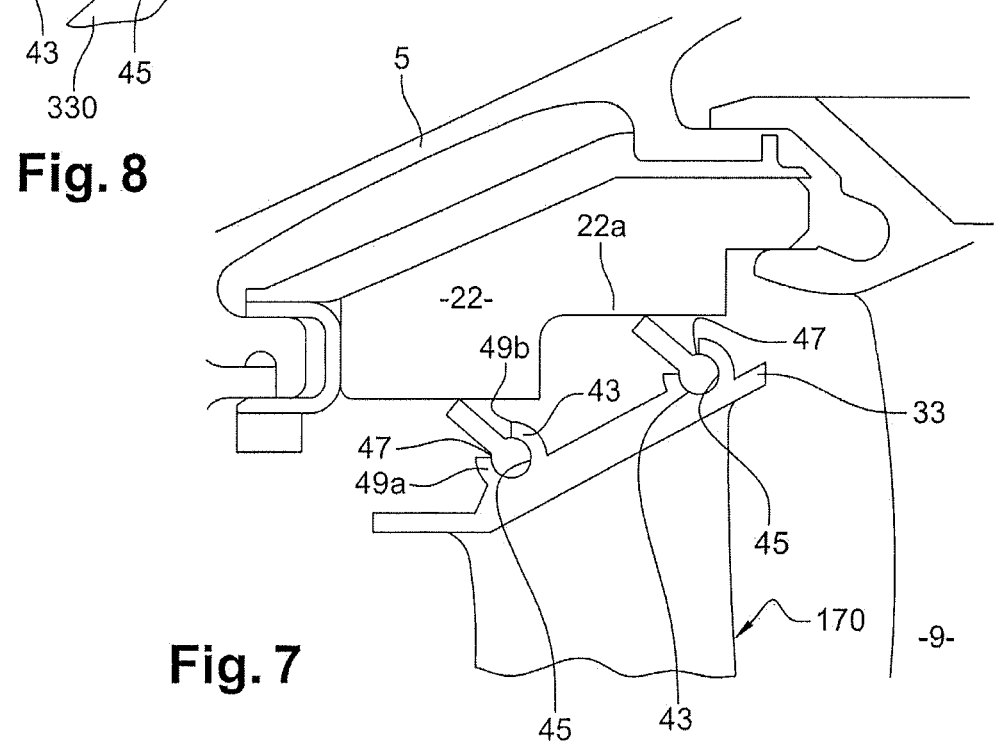
Fig. 7

ROTOR VANE WITH ACTIVE CLEARANCE CONTROL, ROTARY ASSEMBLY AND OPERATING METHOD THEREOF

The invention relates to a rotor vane for an aircraft turbine engine, a rotary assembly for a turbine engine comprising a plurality of such vanes, a method for operating such a rotary assembly, and a method for producing the vane.

The preferred turbine engine is an aircraft turbofan engine.

Document EP0708227 discloses a state of the art and examines the various possible issues concerning the sealing of turbine engine rotor vanes.

Thus, to ensure maximum performances in aircraft turbine engines, it is essential to minimize gas leakage between numbers of stationary and rotating parts of such turbine engines.

Document EP2182174 discloses a clearance controller wherein one end of a vane is provided with a stationary seal. A universal seal, connected with the outer casing surrounding the blades, can come into contact with the stationary seal through a movable mechanical link comprising an articulation.

Document DE 102004050739 discloses a turbine engine rotor vane, one end of which is provided with a sealing element associated with an area of the blade head by means of a movable mechanical link radially in translation.

In the present document, as in the concerned technical field, the terms upstream (AM) and downstream (AV) are defined so that upstream is located axially on the side where the general flow stream from the turbine engine comes from, and downstream is located axially on the side which the same stream flows to. And the terms "inner" and "outer" are defined radially relative to the axis about which the aforesaid rotary elements rotate (axis 7 below), with "axial" and "radial" being defined relative to the same axis 7.

Schematically, along said axis and in the downstream direction, an aircraft turbine engine often has a fan, a low-pressure compressor, a high-pressure compressor, a combustion chamber and successively high pressure and low pressure turbines.

In particular, the turbines each include a stationary part, or stator, and a part rotating about a longitudinal central axis defining a rotor also provided with vanes.

Thus, as is known, the low-pressure turbine 1 of the turbojet or turboprop engine of FIG. 1 comprises several turbine wheels 3 which are arranged in series inside an outer casing 5 which rotate about a central axis 7 of the turbine engine, downstream of a stationary nozzle ring 9, provided with a series of stationary vanes. Each wheel 3 comprises a disc 11 provided with moving vanes 13 at its outer periphery.

As best seen in FIG. 2, which also illustrates the prior art, each disk 11 comprises, at its outer periphery, teeth 23 arranged alternately with grooves, or recesses 25 wherein vane roots 26 are axially engaged and radially retained, with the vanes extending radially from the recesses 25 in an annular flow jet 27 of a hot gas stream from the combustion chamber 15.

More specifically, each vane body 17 radially comprises, from the outside inwards, a blade 19, a platform 29 extending substantially perpendicularly to the axis of elongation of the vane, and a stilt 31 connecting the platform to the vane root 26. The vane roots are radially held in the recesses 25. The platforms 29 are arranged circumferentially end to end so as to define together the reference internal limit of the hot gases flow stream circulating in the turbine.

As previously dealt with in document EP0708227, each vane 13 may be made of a fiber fabric, the portion of which is outside the vane is a brush (or brush seal) 21.

When the vane 6 is rotated, the brush 21 rubs against the track of the casing 5, which casing defines a stationary circumferential envelope, made of one or several parts, around the vanes.

To promote sealing as schematically shown in FIG. 3, a series of blocks 22 made of abradable material internally attached to the casing 5 may radially face the brush seals 21, beyond the outer periphery thereof.

The invention presented here is an alternative, specifically to such a known solution using brushes which may be difficult to implement industrially, all the more since, in the case of low-pressure turbines, thermal stress may be an additional challenge. As a matter of fact, the issue of temperature resistance of brushes, for which choosing a material is a problem, has to be considered.

The problem of predicting the wear between the two contacting parts and planning maintenance has also been taken into account.

As regards documents EP2182174 and DE102004050739, the following has also been taken into account:

easy vane mounting, and applying a solution that is practical in terms of implementation and/or maintenance.

This is why the present invention provides for a motor vane, comprising a body locally defining a blade provided at the radially outer end with a blade head, and further comprising at least one sealing element connected with an area of the blade head by means of a mechanical link which can move between a rest position and an active position, wherein the sealing element radially protrudes from the blade head, with the movable mechanical link comprising a-seal an articulation.

Thus, the sealing element will be able to escape in case of an excessive radial force, thus avoiding any inappropriate wear of the material which it contacts and/or damage to the sealing element itself.

The movable mechanical link comprising a preferably free pivot link, will enable a "self-adjustment" whether the vane is rotated about axis 7, or at rest.

In order to facilitate and secure the production of such a vane, it is recommended that the blade head defines a root, with such root being integrated in the manufactured blade, or attached and fixed thereto. In a known manner, a root is a kind of small platform which forms a rim around the outer end of the blade. The roots together define an outer boundary for the gas flow stream that passes between the blades since they are typically placed side by side circumferentially around the set of vanes, the roots of which are attached to the central disc driving such vanes.

Still to help controlling wear between contacting parts and thus maintenance, it is also advised that the mobile sealing element should be made of a composite material.

Structurally, it is also recommended that, for said movable mechanical link:

the sealing element should have a base and the blade head a protrusion, and that one among the base and the protrusion should define a concave bowl in which an externally convex shape of the other among the protrusion and the base will be engaged.

Thus, both holding in translation and articulation will be ensured.

To facilitate the integral and solid manufacturing of the base of the sealing element base, one advises that the latter should have an externally convex shape then movably engaged into a concave bowl of the blade head.

Structurally speaking again, said concave bowl will preferably have an opening wherein the externally convex shape will be engaged, with the edges of the opening defining abutments for the mobility of the external sealing element relative to the blade head. As for the rotary assembly for a turbine engine also concerned here, it is recommended that it should include:

a rotor disc mounted such that it can rotate around the longitudinal axis of the engine and having grooves on its outer periphery, a series of rotor vanes like those mentioned above, each one being attached to the rotor disc,—and a stationary casing provided with contact blocks, for example made of an abradable material, surrounding the vane sealing elements, with such elements being movable relative to the contact blocks without necessarily flexing.

In accordance with the desired mobility of the sealing element/blade head, it is also provided that on each rotor vane, the or each sealing element shall preferably be movable relative to the blade head at least along an axis substantially transverse to the axis about which the rotor disc is rotatably mounted.

As regards the operating method of such rotary assembly which an aspect of the invention further relates to, it is advantageously provided that said movable sealing elements shall all come into contact with contact blocks, only from a predetermined rotational speed of the vanes.

Furthermore, in addition or not to this, it will advantageously be provided that said movable sealing elements shall be variably inclined, without necessarily flexing relative to the contact blocks, based on at least one of the blade rotational speed, the temperature of at least one of said vanes, and the cooling of the casing which the blocks are internally fixed to, and/or according to the wear of the abradable material, which will be softer than that the sealing elements are made of.

As regards the manufacturing of a rotor vane of the above-mentioned type, it is recommended as follows in this application:

the rotor vane should be provided by orienting the concave bowl transversely to a longitudinal axis of the vane, each sealing element should be separately manufactured, and the concave bowl and the externally convex shape should be engaged together by sliding.

Such sliding will advantageously be free, so that holding of the final locking will be preferably obtained by abutment against the adjacent vanes.

The invention should be better understood, and other details, characteristics and advantages of the invention will appear upon reading the following description given by way of a non-restrictive example while referring to the appended drawings wherein:

FIGS. 1, 2, 3 relating to the prior art are thus respectively a schematic half view in axial section of a low-pressure turbine, a perspective view of blades each engaged by their lower end into the recesses of one of the rotor disks and a front view of a brush seal as disclosed in EP0708227;

FIGS. 6, 7 are views identical with FIG. 4 but with the turbine respectively rotating at an intermediate speed and the highest speed;

and FIG. 8 is an alternative embodiment.

Figure 1:
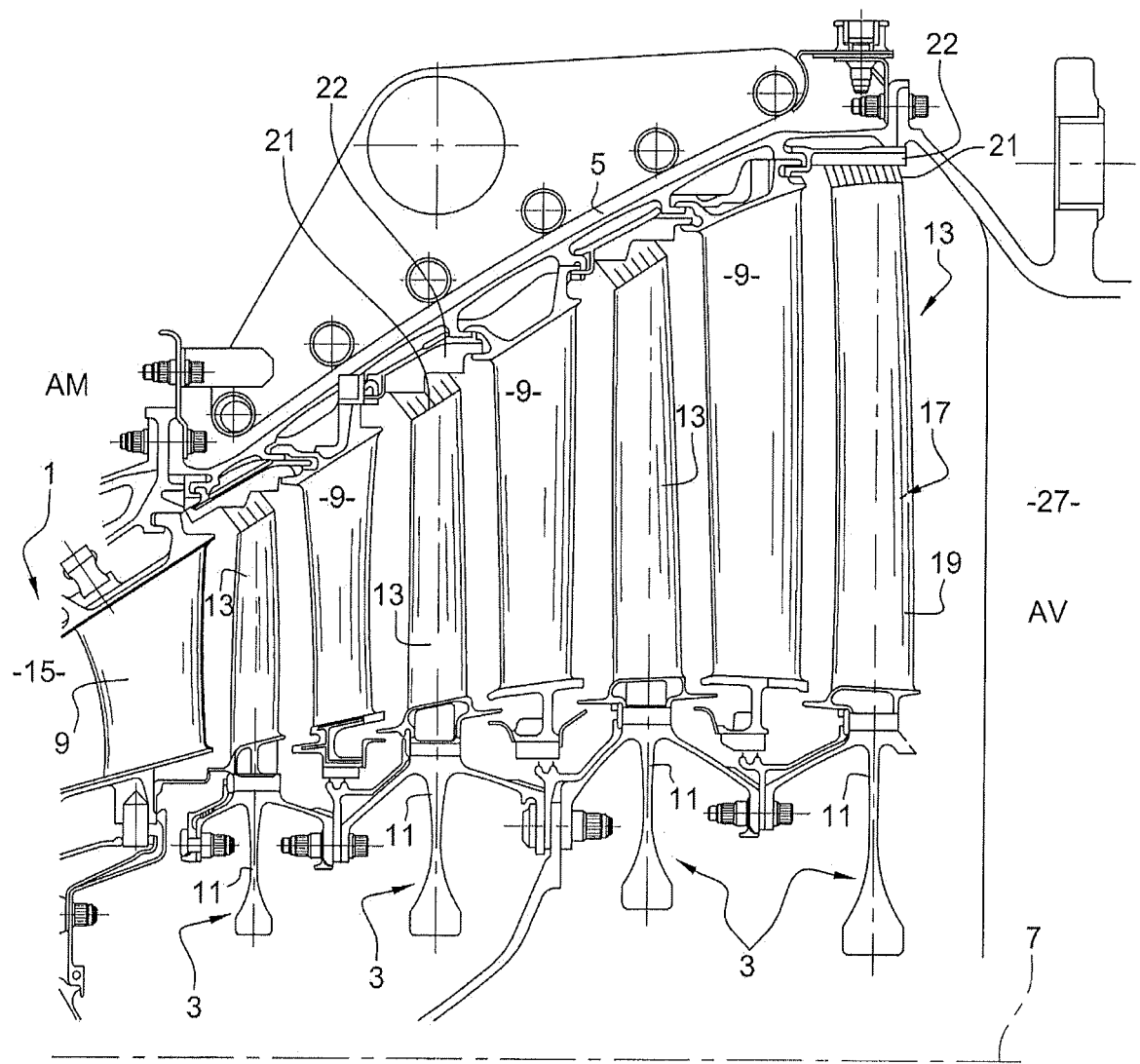
Figure 3:
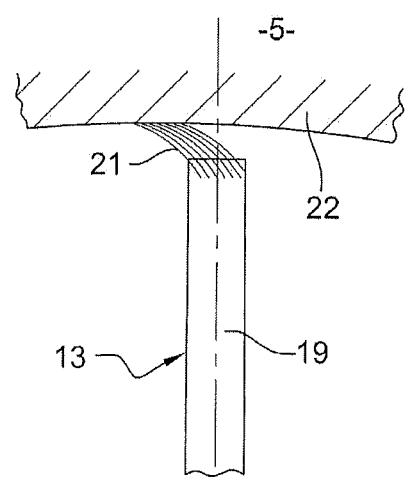

According to the invention, and as explained above, the solution exposed here thus requires replacing the brush seal of the embodiment of FIGS. 1, 3 with another solution that does not impose manufacturing each vane using composite material like the one mentioned in EP0708227.

Figure 2:
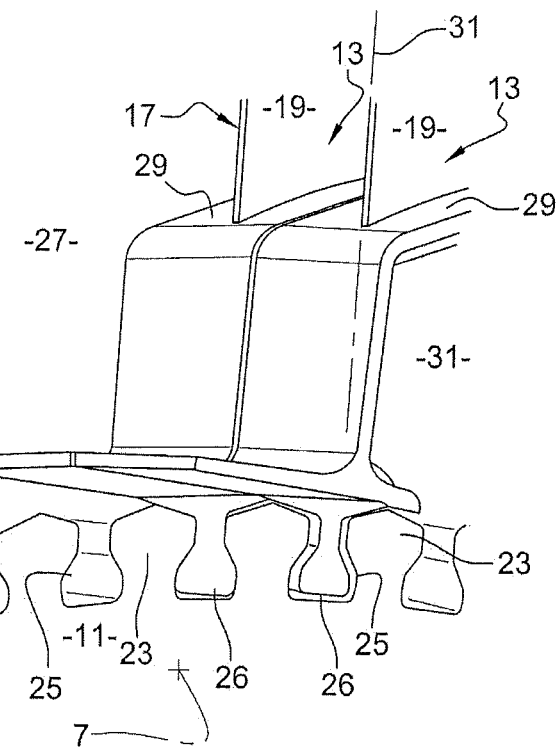
Figure 4:
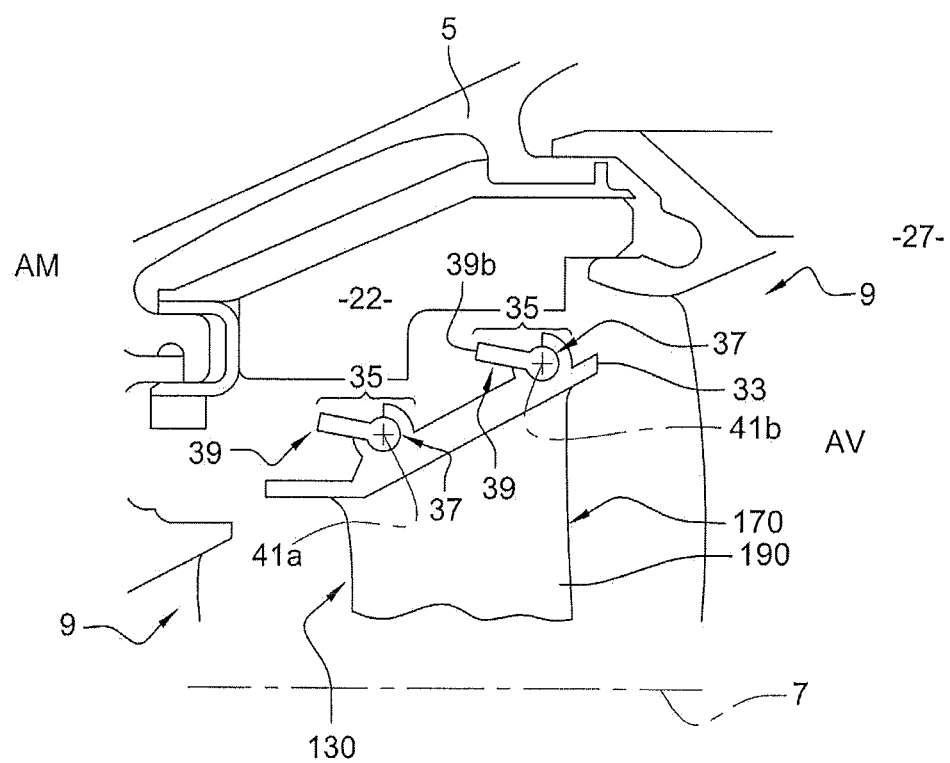
FIG. 4 is an axial partial schematic view in section of the top of a vane according to the invention, opposite the concerned part of the stationary low pressure turbine casing then at rest.

FIG. 4 and the following schematically illustrate possible embodiments of such a solution. The elements identical to those of the preceding figures bear the same reference number, while still existing, but modified parts of the vanes bear a reference number incremented by a hundred. Thus, the vanes 13 become 130, which can be substituted for those of FIG. 1 and each be designed as schematically shown in FIG. 2, as regards their inner part.

Apart from the fact that it can be metallic, for example forged or cast, each rotor vane 130, which of course rotates around the axis 7, includes a body 170 locally defining a blade 190 provided at a radially outer end with a blade head 33, i.e. an end portion adapted to be (integrally or additionally) provided with at least one sealing element 39.

Figure 5:
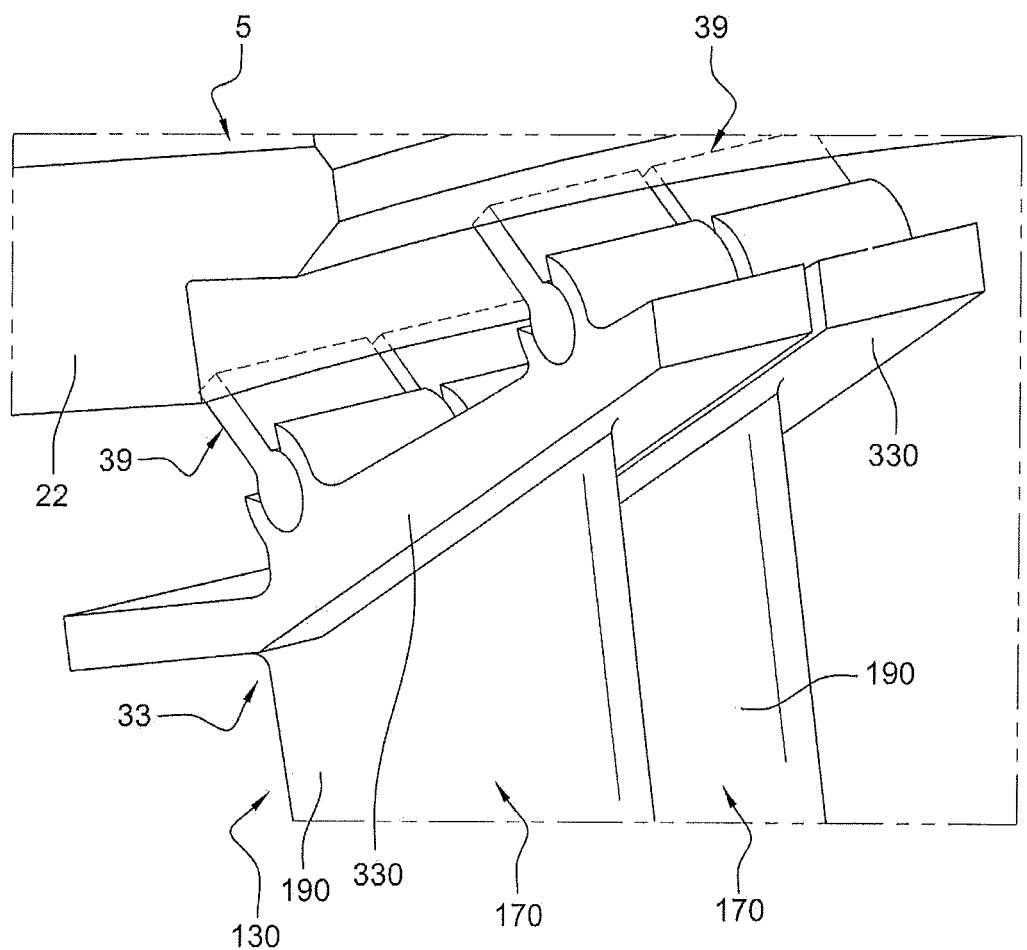
FIG. 5 is a partial schematic view in perspective of the same area as that in FIG. 4, with the turbine rotating.

Preferably, each blade head 33 will be defined by or include a root 330, a possible illustration of which can be seen, more particularly in FIG. 5.

There is therefore a small platform, which defines a rim at the radially outer end of the blade considered.

Conventionally, all these roots 330 form a ring around the radiating blades 190 and directs the annular flow stream 27 outwards.

In the following description, it has been considered, in conjunction with the embodiment illustrated in FIGS. 4 to 7 and without limitation, that such a root is present on each blade.

Thus, beyond the radially outer end of its root, each vane 130 includes at least one, here two sealing element (s), with said sealing elements 39 so extending that the free end of the considered outer sealing element can be more or less spaced from the root, radially outwards, as can be seen when comparing the FIGS. 4, 6, 7.

Specifically, this ability is here provided by at least one, here two, movable mechanical link(s) 37 provided between at least one, here two, area (s) 35 of the root and the sealing element(s) 39.

Thus, by varying the specifically radial position of the sealing element (s) 39 (s) via the movable mechanical link(s) 37 thereof, it is possible to adapt the peripheral sealing between each root 330 and the track of the opposite casing or enclosure defined in the preferred example considered by the block 22 made of abradable material.

The issue of predicting the wear between both contacting parts and of planning maintenance will also be all the less a problem since, as shown, each movable mechanical link 37 includes an articulation which enables, by pivoting, a retraction of the sealing element 39 concerned, in case of an excessive force.

In the preferred embodiment of FIGS. 4 to 6, each movable mechanical link 37 thus comprises a pivot link, with each one being rotatably mounted about an axis, respectively 41*a*, 41*b*, substantially transverse to the axis 7.

Besides, to structurally achieve the or each movable mechanical link, it is more particularly recommended, as schematically shown in FIGS. 6 and 8:

that the sealing element 39 should have a base 39a and the root 330 a protrusion 33a, on its outer face 33b, and that one of the base and the protrusion should define a concave bowl 43 in which an externally convex shape 45 of the other one of the protrusion and the base is engaged.

In addition, in order to also ensure a good mechanical strength and easy manufacturing and maintenance, it is recommended that each sealing element 39 should have, instead, as shown in the embodiments of FIGS. 4 to 7, an externally convex base 39a movably engaged into a concave bowl 43 of the root 330.

Radially outwards, each base 39a will preferably be extended by a blade-shaped portion 39b adapted to come at its free end in abutment with a circular sector against the face 22a opposite the track adjacent thereto, and which, in the preferred example, belongs to the block 22 concerned.

To promote articulation movements, or more generally for ensuring the mobility of the outer sealing element 39 relative to the root 330, the matching concave bowl 43 shall preferably have an opening 47 in which the externally convex shape 45 provided will be engaged.

The edges of each opening 47 may laterally define abutments for the outer sealing element 39 relative to the root 330, such as 49a, 49b in FIG. 6.

As illustrated in FIGS. 4 to 6, each root 330 of a rotor vane 130 preferably comprises two outer sealing elements 39, one upstream the other one downstream, thereby forming a double barrier.

In order to combine lightness, mechanical strength, easy manufacture and maintenance, it is also recommended that each sealing element 39 should be made of a composite material, such as ceramic matrix composite, or CMC.

Such a solution will more particularly and contrary to the brush 21 solution of the prior art mentioned above, make it possible for the sealing elements 39 to be movable relative to the blocks 22 made of abradable material, without necessarily flexing, with the aforementioned mobility not having to cause flexing.

When at rest as shown in FIG. 4, the sealing elements 39 illustrated elements are, by gravity, resting against one of their abutments 49a, 49b.

On the contrary, when the rotor is rotating, the matching sealing element 39 is raised further radially as shown in FIGS. 6, 7.

The downstream abutment 49b can also be so positioned that the matching sealing element 39 cannot go beyond the radial direction 51, so that it always impedes the flow of gas in the downstream direction, in this area, while the rotor is rotating.

As part of this operation, it is moreover provided that said movable sealing elements 39 will preferably be inclined relative to the body 170, and particularly to the concerned root 330, again without necessarily flexing and especially variably relative to the considered blocks 22 made of abradable material, depending on the rotational speed of the vanes 130.

In this regard, FIGS. 5, 6 show that, relative to the rest position of FIG. 4, the movable sealing elements 39, then in operative position, are more inclined outwardly and the radial axis 51 when the turbine rotates at an intermediate speed (FIG. 6) than when it rotates at a higher speed (FIG. 7), specifically at full rated speed (with the sealing blocks 22 being assumed in good condition). This is due to differential expansions, which occur, and to the radial approximation which then occurs between the roots 33 and the sealing blocks 22. It should also be noted that the distance between the blade heads and the matching abradable ring, defined by the circumferential array of blocks 22 will depend on the speed of rotation of the vanes, but on other operating conditions too, such as the expected engine power output, via an injection of more or less fuel and/or the duration of the high load and/or high rotational speed of the turbine.

Thus, the above distance is shorter in FIG. 7 than in FIG. 6 and accordingly the movable sealing elements 39 are further inclined to the radial direction 51 in FIG. 6 than in FIG. 7.

It is also provided that the same moving sealing elements 39 will variably be inclined, again without necessarily flexing with respect to the sealing blocks 22, according to the wear of the abradable material. Therefore, it will be relevant to use a downstream abutment 49b is located disposed so that the matching sealing element 39 will not be able to go beyond the radial direction 51.

As an alternative solution to the embodiment of FIGS. 4 to 7, FIG. 8 shows a (not preferred) solution wherein:

the sealing element 39 has a base 39a and the root 330 a protrusion 33a, on its outer face 33b, and the base defines a concave bowl 43, wherein the externally convex shape 45 of the protrusion 33a of the root is engaged.

As regards now the articulated sealing elements 39, the mounting will, in particular for the illustrated pivot link, be obtained by fit-sliding (axis 41a, 41b) each sealing element, in compliance with the slight clearance required for pivoting (preferably freely pivoting), as in the case of a dovetail mounting. Sliding locking will preferably be obtained by the considered sealing element abutting against the adjacent vanes, as can be understood when looking at FIG. 5.

As for the abradable material which each contact block 22 may be made of, it will preferably be made of a softer material than the materials of the sealing elements 39. These may be made of ceramic matrix composite, or CMC, with the same advantages as those mentioned above.

The invention claimed is:

1. A rotor vane for a turbine engine adapted to rotate about an axis, the rotor vane comprising a body locally defining a blade provided at a radially outer end with a blade head, and at least one sealing element articulated with an area of the blade head by means of a mechanical pivot link, so that said at least one sealing element can articulate between:
   a rest position, and
   an active position, in which the sealing element radially protrudes from the blade head, wherein the articulation of said at least one sealing element with said area of the blade head is limited in the active position by a downstream abutment which is so positioned so that said at least one sealing element cannot pivot downstream beyond a direction radial to said axis.

2. A rotary assembly for a turbine engine comprising:
   a rotor disc rotatably mounted about an axis,
   a series of rotor vanes, each fixed to the rotor disc, and at least some of which comprise:
      a body locally defining a blade having a blade head at a radially outer end, and,
      at least one sealing element articulated with an area of the blade head by means of a mechanical link, so that said at least one sealing element can move with respect to the blade between:
         a rest position, and,
         an active position, wherein the sealing element radially protrudes from the blade head,
   a fixed casing provided with blocks for the contact with the sealing elements of the rotor vanes surrounded by said blocks, with the sealing elements thus being movable relative to said contact blocks, wherein the sealing elements are rigid, so that the sealing elements come into contact with said blocks, in the active position, without flexing prior to said contact, wherein the articulation of said at least one sealing element with said area of the blade head is limited in the active position by a downstream abutment which is so positioned that said at least one sealing element cannot pivot downstream beyond a direction radial to said axis.

3. The rotary assembly according to claim 2, wherein the blade head defines a root.

4. The rotary assembly according to claim 2, wherein the movable mechanical link comprises a pivot link.

5. The rotary assembly according to claim 2, wherein for having the movable mechanical link to pivot:
   the sealing element has a base and the blade head has a protrusion,
   and one of the base and the protrusion defines a concave bowl in which an externally convex shape of the other one of the protrusion and the base is engaged.

6. A method for producing a rotor vane for a turbine engine according to claim 5, wherein:
   the rotor vane is provided by orienting the concave bowl transversely to a longitudinal axis of the vane,
   the sealing element (s) is/are achieved,
   and the concave bowl and the externally convex shape are engaged together by sliding.

7. The rotary assembly according to claim 5, wherein said concave bowl has an opening wherein the externally convex shape is engaged, with the edges of the opening defining abutments for the mobility of the external sealing element relative to the blade head, one of said abutments so positioned that said at least one sealing element cannot go beyond a radial direction.

8. The rotary assembly according to claim 2, wherein the sealing element has a base having an externally convex shape movably engaged in a concave bowl of the blade head.

9. The assembly according to claim 2, wherein on each rotor vane, the or each sealing element is so mounted as to move freely so that the rotor disc rotating the vanes moves the sealing elements towards the active position.

10. A method for operating the rotary assembly according to claim 2, wherein:
    said moving sealing elements of the rotor vanes all come into contact with the contact blocks only from a predetermined speed of rotation of the vanes and/or
    said moving sealing elements of the rotor vanes are variably inclined relative to the contact blocks, without flexing, depending on the speed of rotation of the vanes.

11. A method for operating a rotary assembly for a turbine engine according to claim 2, wherein said moving sealing elements of the rotor vanes are variably inclined relative to the contact blocks, without flexing, according to at least one of a speed of rotation of the rotor vanes, a temperature of at least one of said rotor vanes, and a cooling of the fixed casing which the blocks are internally fixed to.

12. A rotor vane for a turbine engine adapted to rotate about an axis, the rotor vane comprising a body locally defining a blade provided at a radially outer end with a blade head, and at least one sealing element connected with an area of the blade head by means of a mechanical link, so that said at least one sealing element can move between:
    a rest position, and,
    an active position, in which the sealing element radially protrudes from the blade head,
wherein the mechanical link comprises an articulation, so that, the sealing element having a base and the blade head having a protrusion, one of the base and the protrusion defines a concave bowl in which an externally convex shape of the other one of the protrusion and the base is engaged, and wherein said concave bowl has an opening within which the externally convex shape is engaged, with the edges of the opening defining downstream abutments for the mobility of the external sealing element relative to the blade head, one of said abutments being so positioned as that said at least one sealing element cannot go pivot downstream beyond a direction radial to said axis.

\* \* \* \* \*